(12) United States Patent
Lin et al.

(10) Patent No.: US 8,918,142 B2
(45) Date of Patent: Dec. 23, 2014

(54) SMART MOBILE COMMUNICATION DEVICE

(75) Inventors: Han-Chang Lin, Taipei (TW); Cho-Yi Lin, Taipei (TW)

(73) Assignee: Cho-Yi Lin, Taipei (TW)

( * ) Notice: Subject to any disclaimer, the term of this patent is extended or adjusted under 35 U.S.C. 154(b) by 273 days.

(21) Appl. No.: 13/471,640

(22) Filed: May 15, 2012

(65) Prior Publication Data

US 2013/0196712 A1 Aug. 1, 2013

(30) Foreign Application Priority Data

Feb. 1, 2012 (TW) .............................. 101201859 U

(51) Int. Cl.
*H04B 1/38* (2006.01)
*H04W 88/02* (2009.01)

(52) U.S. Cl.
CPC ..................................... *H04W 88/02* (2013.01)
USPC ....................................... 455/557; 455/575.1

(58) Field of Classification Search
CPC ....... G01S 11/12; G01S 17/026; G01S 17/46; G01S 3/7803; G01S 3/7835; G01S 7/4811; G01S 7/4913; G01S 7/497; G02B 5/20; H04W 88/02; H04W 12/06; H04W 24/00; H04W 52/027; G06F 3/044; G06F 2203/04107; G06F 3/03547; G06F 2203/04106; H04L 67/10; H04M 1/0202; H04M 1/0214; H04M 1/0245; H04M 1/22; H04M 1/72519; H04M 1/72569; H04M 1/72572; H04M 2250/12; H01L 27/14621; H01L 27/14601; H01L 27/14625; H01L 27/14692; H01L 27/322; H01L 29/78633; H01L 31/0232; H01L 51/44; H01L 51/52; G09G 2310/0275; G09G 2320/08; G09G 3/36
USPC ......... 455/41.1–41.3, 566, 575.1–575.9, 90.3
See application file for complete search history.

(56) References Cited

U.S. PATENT DOCUMENTS

| | | | |
|---|---|---|---|
| 2008/0127739 A1* | 6/2008 | DeAngelis et al. | ............. 73/718 |
| 2009/0286479 A1* | 11/2009 | Thoresson et al. | ........... 455/41.3 |
| 2011/0312349 A1* | 12/2011 | Forutanpour et al. | ......... 455/466 |
| 2013/0084922 A1* | 4/2013 | Liu et al. | ........................ 455/566 |
| 2014/0052017 A1* | 2/2014 | Kapoor | ............................ 600/547 |

\* cited by examiner

*Primary Examiner* — Lana N Le
(74) *Attorney, Agent, or Firm* — Stevens & Showalter, LLP

(57) ABSTRACT

A smart mobile communication device comprises a casing, a touch screen and two sensors. The casing has a front surface and at least two opposite holding surfaces. The front surface is disposed between the at least two opposite holding surfaces. The touch screen is disposed on the front surface to be used as a main operation interface of the smart mobile communication device. The two sensors are disposed on the at least two opposite holding surfaces respectively to be used as secondary operation interfaces of the smart mobile communication device. Accordingly, the convenience for operating the smart mobile communication device can be enhanced.

6 Claims, 6 Drawing Sheets

SMART MOBILE COMMUNICATION DEVICE

CROSS-REFERENCE TO RELATED APPLICATIONS

This non-provisional application claims priority under 35 U.S.C. §119(a) on Patent Application No(s). 101201859 filed in Taiwan, R.O.C. on Feb. 1, 2012, the entire contents of which are hereby incorporated by reference.

BACKGROUND

1. Technical Field

The disclosure relates to an electronic device and more particularly to a smart mobile communication device.

2. Related Art

As information technology advances, the manufacturing techniques for electronic products have improved. Electronic products tend to have more excellent performance except for lightness and compactness.

Take smart phone as illustration, users can receive and send emails, view stock trends, make schedules for important meetings, and knowing the latest information by a smart phone. Furthermore, users can use a smart phone with global positioning system (GPS) function for navigation. In addition, users can use mapping software and satellite navigation system in a smart phone connecting a network to plan travel routes and view comments on sightseeing spots. Generally, touch screen is widely used for a smart phone, and users can input commands by touching the screen in order to perform multimedia interactions, such as playing games and browsing web pages.

However, when needing to operate a smart phone, a user uses one hand to hold the smart phone, and uses a finger of the other hand to touch the screen of the smart phone. In other words, only the fingers of one hand are used for operating the phone, which causes the convenience for playing certain games or browsing web pages.

SUMMARY

A smart mobile communication device disclosed by the disclosure comprises a casing, a touch screen and two sensors. The casing has a front surface and at least two opposite holding surfaces. The front surface is disposed between the at least two opposite holding surfaces. The touch screen is disposed on the front surface for being a main operation interface of the smart mobile communication device. The two sensors are disposed on the at least two opposite holding surfaces respectively for being secondary operation interfaces of the smart mobile communication device.

A smart mobile communication device disclosed by the disclosure comprises a casing, a touch screen and two sensors. The casing has a front surface and at least two opposite holding surfaces. The front surface is disposed between the at least two opposite holding surfaces. The touch screen is disposed on the front surface for being a main operation interface of the smart mobile communication device. The two sensors are disposed on one of the at least two opposite holding surfaces for being secondary operation interfaces of the smart mobile communication device.

A smart mobile communication device disclosed by the disclosure comprises a casing, a touch screen and two sensors. The casing has a front surface a back surface opposite to each other. The touch screen is disposed on the front surface for being a main operation interface of the smart mobile communication device. The two sensors are disposed on the back surface for being secondary operation interfaces of the smart mobile communication device.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
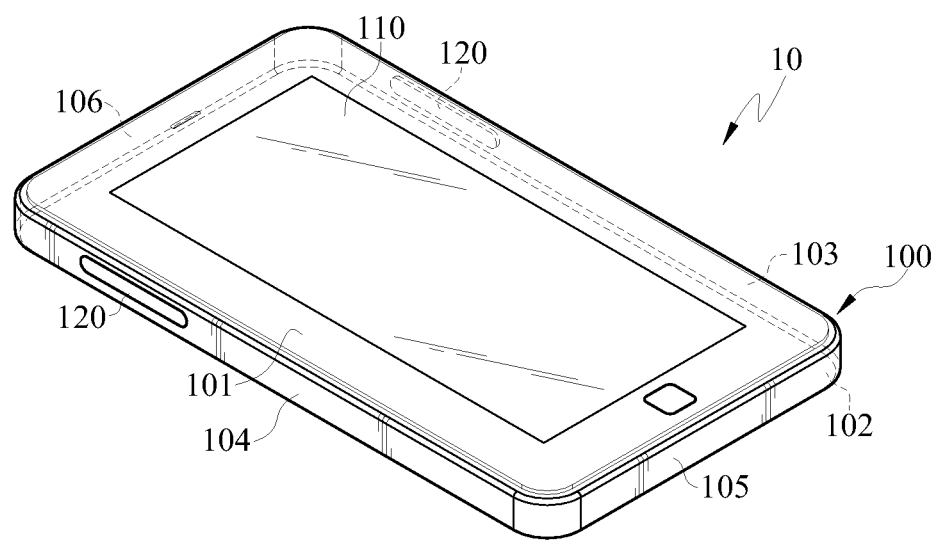
FIG. 1 is a perspective view of a smart mobile communication device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a perspective view of a smart mobile communication device according to an embodiment of the disclosure. For example, the smart mobile communication device 10 in this embodiment may be but is not limited to be a smart phone. The smart mobile communication device 10 comprises a casing 100, a touch screen 110 and two sensors 120. The casing 100 has a front surface 101 and a back surface 102 opposite to each other, and two pairs of holding surfaces (103, 104) and (105, 106). The holding surfaces in respective pair face each other, and these holding surfaces 103, 104, 105 and 106 are disposed between the front surface 101 and the back surface 102. More specifically, the holding surfaces 103 and 104 are disposed at two opposite sides of the casing 100 respectively, and the holding surfaces 105 and 106 are disposed at another two opposite sides of the casing 100. For example, the holding surfaces 103 and 104 may be disposed at two opposite long sides of the casing 100, and the holding surfaces 105 and 106 are disposed at two opposite short sides of the casing 100. Moreover, the front surface 101 is disposed between the holding surfaces 103 and 104, and the front surface 101 is also disposed between the holding surfaces 105 and 106.

The touch screen 110 is disposed on the front surface 101 and is used as the main operation interface of the smart mobile communication device 10. That is, the main operation interface, i.e., the touch screen 110, can be used by users to input commands to operate the smart mobile communication device 10, such as inputting words, switching on or off the device, or choosing a program from a program menu.

The two sensors 120 are disposed on the holding surfaces 103 and 104 respectively, and they are used as the secondary operation interfaces of the smart mobile communication device 10. More particularly, the secondary interfaces, i.e., the two sensors 120, can be used by users to perform shortcut commands, such as adjusting the volume, rolling the browsed pages or changing modes.

Figure 2:
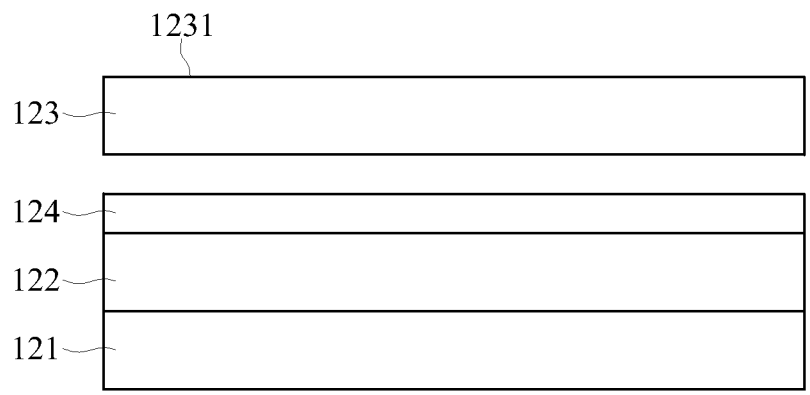
FIG. 2 is an illustration of a sensor according to an embodiment of the disclosure.

FIG. 2 is an illustration of a sensor according to an embodiment of the disclosure.

In this embodiment or other embodiments, a sensor 120 can be a capacitive sensor which comprises a substrate 121, a sensing layer 122, and a touch plate 123. The sensing layer 122 is disposed on the substrate 121. The touch plate 123 is disposed above the sensing layer 122. The touch plate 123 has a contact surface 1231 on its back side relative to the sensing layer 122. When a finger touches the contact surface 1231, the sensing layer 122 can sense the moving direction of the finger on the contact surface 1231 and transmit the direction information to a processor in the smart mobile communication device 10. In this manner, the direction information can be converted into an input command. In actual manufacture, the sensors 120 can be made as a module in order to reduce the cost of the smart mobile communication device 10.

Furthermore, in this embodiment or other embodiments, the sensor 120 can further comprise an electromagnetic shielding layer 124 which is disposed between the touch plate 123 and the sensing layer 122. The electromagnetic shielding layer 124 is used to shield electromagnetic wave for the sensing layer 122 to prevent generating noise resulting from electromagnetic wave.

With reference to FIGS. 1 and 2, in this embodiment or other embodiments, the sensor 120 can also be embedded into the casing 100 so that the contact surface 1231 and the holding surface 103 (or the surface 104) are on a same plane. Alternatively, in this embodiment or other embodiments, the touch plate 123 of the sensor 120 can also be formed with the casing 100 as a whole to make the touch plate 123 as a part of the casing 100.

Figure 3:
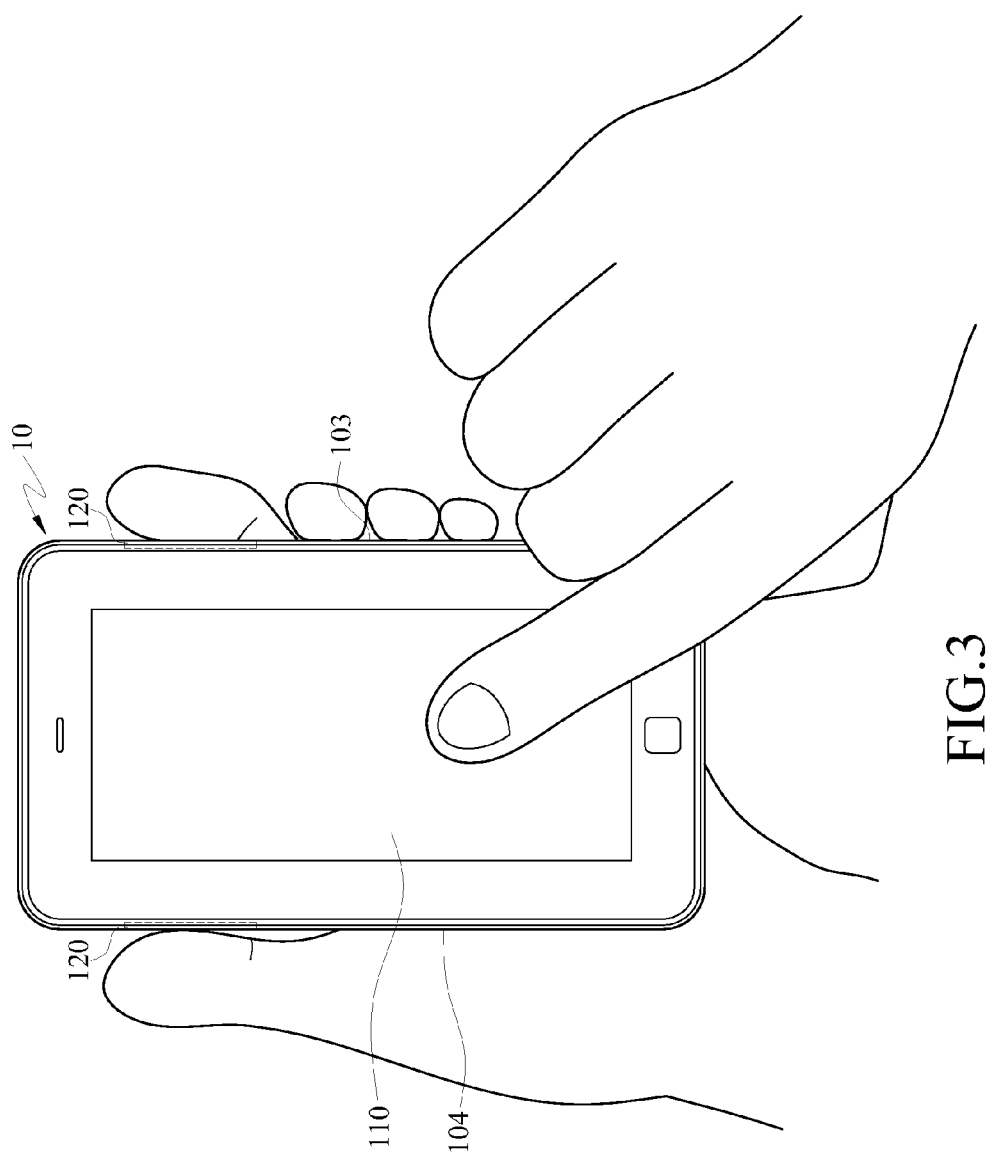
FIG. 3 is an illustration of a smart mobile communication device in operation according to an embodiment of the disclosure.

FIG. 3 shows an embodiment of a smart mobile communication device in operation. The following descriptions are presented with reference to FIGS. 1 and 3.

For example, when a user uses the left hand to hold the smart mobile communication device 10 by the holding surfaces 103 and 104, the user can use a finger of the right hand to touch the touch screen 110 to view web pages. At the same time, the user can use the thumb and index fingers of the left hand to touch the two sensors 120 on the holding surfaces 103 and 104 respectively in order to roll the web pages displayed on the touch screen 110. For example, when a user uses a finger of the right hand to the touch screen 110 to view pictures, the user can also use the thumb and index fingers to respectively control the two sensors 120, so as to turn to the next page or the last page of picture.

Figure 4:
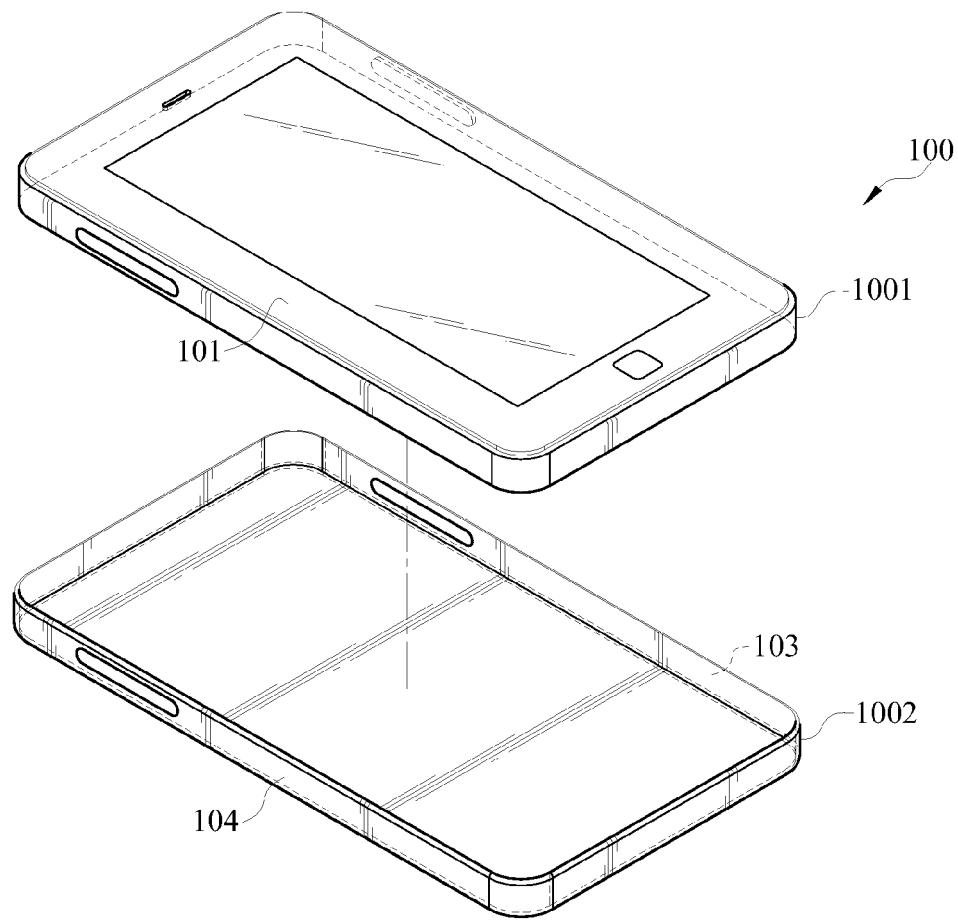
FIG. 4 is a perspective view of a casing of the smart mobile communication device according to an embodiment of the disclosure.

FIG. 4 is a perspective view of the casing of the smart mobile communication device according to an embodiment of the disclosure. The following descriptions are presented based on FIGS. 1, 2, and 4.

In this embodiment or other embodiments, the casing 100 further comprises an upper casing element 1001 and a lower casing element 1002. The front surface 101 is disposed on a side of the upper casing element 1001. The holding surfaces 103 and 104 are disposed on two opposite sides of the lower casing element 1002. The lower casing element 1002 is detachable to the upper casing element 1001. More specifically, the touch plates 123 of the sensors 120 is disposed on the lower casing element 1002, and the electromagnetic shielding layers 124, the sensing layers 122 and the substrates 121 of the sensors 120 are disposed on the upper casing element 1001. When the lower casing element 1002 is installed to the upper casing element 1001, the touch plates 123 are superimposed on the electromagnetic shielding layers 124. As a result, users can replace the lower casing element 1002 at their will without affecting normal functions of the sensors 120.

Figure 5:
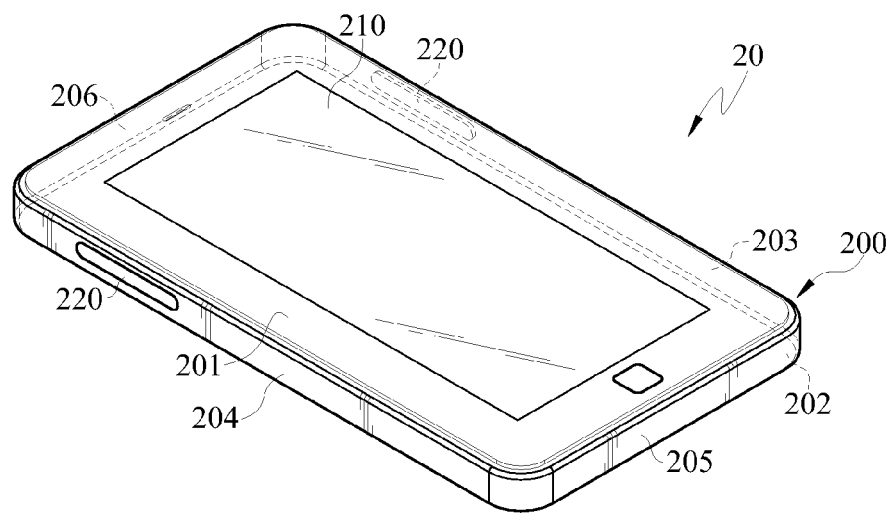
FIG. 5 is a perspective view of the smart mobile communication device according to another embodiment of the disclosure.
Figure 6:
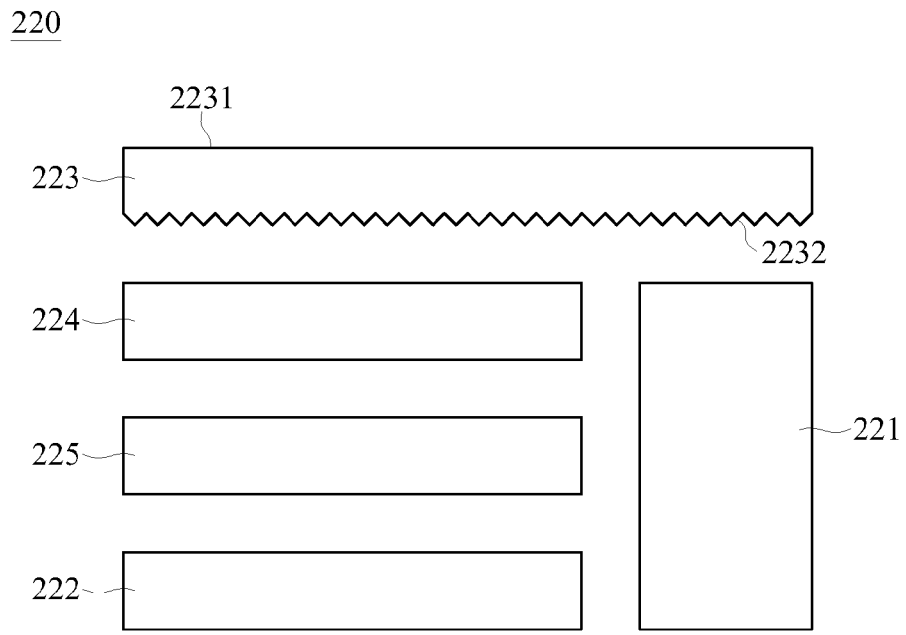
FIG. 6 is an illustration of the sensor according to another embodiment of the disclosure.

FIG. 5 is a perspective view of a smart mobile communication device according to another embodiment of the disclosure. FIG. 6 is an illustration of a sensor according to another embodiment of the disclosure. The structure of the smart mobile communication device according to this embodiment are substantially the same as that of the embodiment as shown in FIG. 1. Therefore, the similarities will not be mentioned herein again.

The smart mobile communication device 20 of this embodiment comprises a casing 200, a touch screen 210 and two sensors 220. The casing 200 has a front surface 201 and a back surface 202 opposite to each other, and two pairs of holding surfaces (203, 204) and (205, 206). In each pair, the holding surfaces face each other. Furthermore, the holding surfaces 203, 204, 205 and 206 are disposed between the front surface 201 and the back surface 202.

In this embodiment, the sensors 220 are optical sensors. The sensor 220 further comprises an image sensor 222, a transparent plate 223 and an infrared light emitting unit 221. In addition, in this embodiment or other embodiments, the sensor 220 can further comprise an optical lens set 224 and an infrared light filter 225. The infrared light filter only allows infrared light to pass through. The transparent plate 223 is disposed above the image sensor 222, and a contact surface 2231 is disposed on the back side of the transparent plate 223 relative to the image sensor 222. The contact surface 2231 is used to be touched by fingers. The infrared light emitting unit 221 is disposed by a side of the image sensor 222. The optical lens set 224 is disposed between the transparent plate 223 and the image sensor 222. The infrared light filter 225 is disposed between the optical lens set 224 and the image sensor 222.

The infrared light emitting unit 221 is used for emitting infrared light to the transparent plate 223. The wavelength of the infrared light is, for example, between 800 nm and 960 nm. The image sensor 222 is used for obtaining image of the infrared light reflected from the contact surface 2231 through the infrared light filter 225 and the optical lens set 224. Then, the image is transmitted to a processor in the smart mobile communication device 20 so as to converting the image into an input command.

Additionally, in this embodiment or other embodiments, the transparent plate 223 has a light-guiding function. The transparent plate 223 may have a scattering structure 2232, for example, a grating, on the side facing the image sensor 222. The scattering structure 2232 can make the light evenly scattered on the transparent plate 223 in order to enhance the quality of the image obtained by the image sensor 222.

Figure 7:
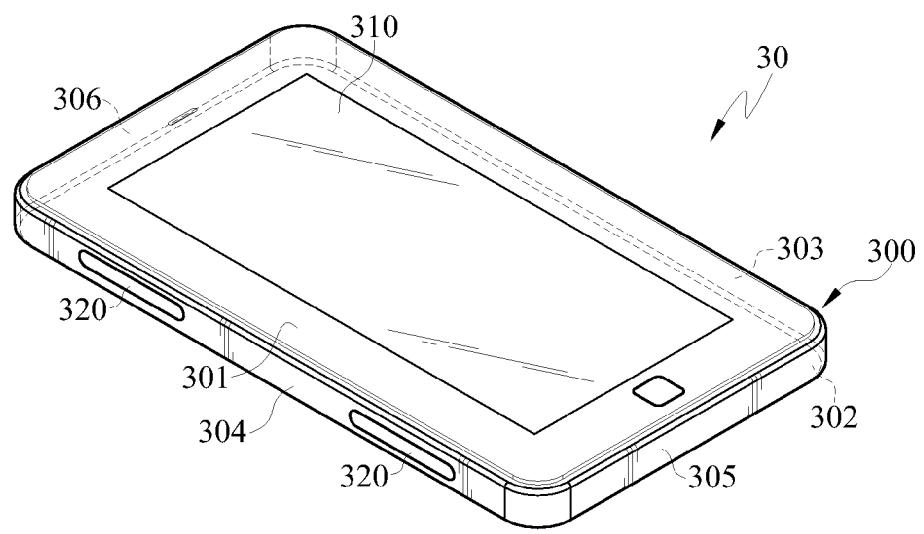
FIG. 7 is a perspective view of the smart mobile communication device according to yet another embodiment of the disclosure.
Figure 8:
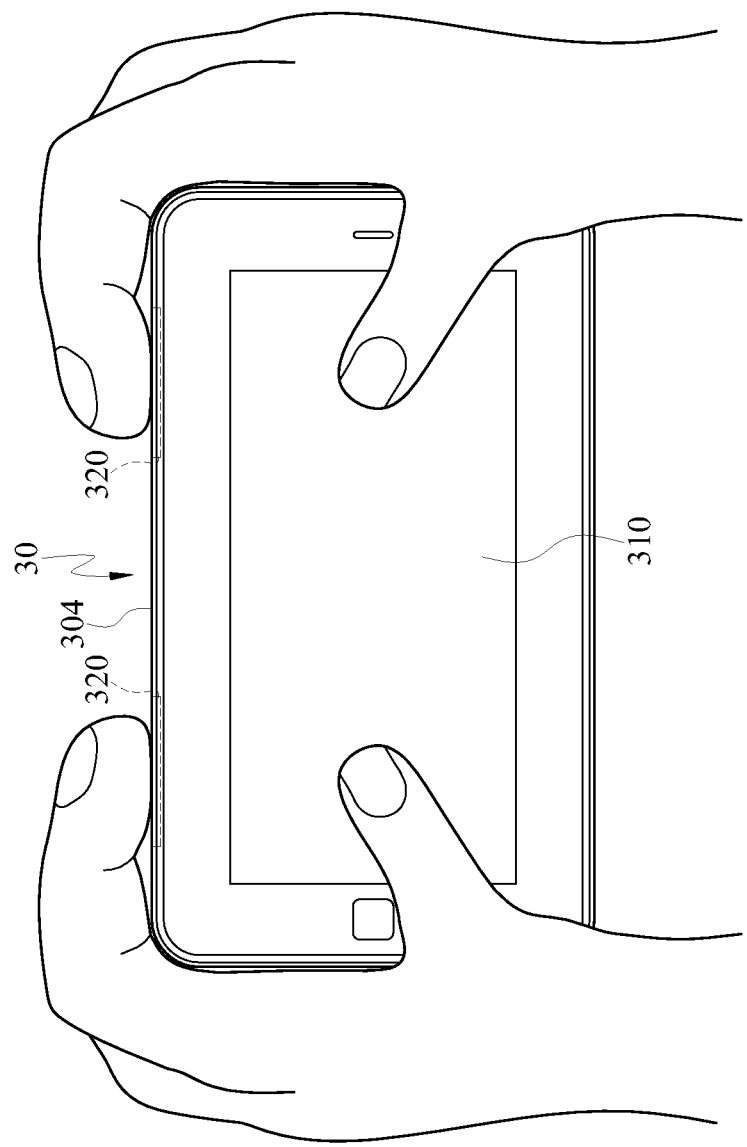
FIG. 8 is an illustration of a smart mobile communication device in operation according to yet another embodiment of the disclosure.

FIG. 7 is a perspective view of a smart mobile communication device according to yet another embodiment of the disclosure. FIG. 8 is an illustration of the smart mobile communication device of FIG. 7 in operation. The structure of the smart mobile communication device according to this embodiment is substantially the same as that of the embodiment in FIG. 1. Therefore, the similarities will not be mentioned herein again.

The smart mobile communication device 30 of this embodiment comprises a casing 300, a touch screen 310 and two sensors 320. The casing 300 has a front surface 301 and a back surface 302 opposite to each other, and two pairs of holding surfaces (303, 304) and (305, 306). In each pair, the holding surfaces face each other. Moreover, the holding surfaces 303, 304, 305 and 306 are disposed between the front surface 301 and the back surface 302.

In this embodiment, the touch screen 310 on the front surface 301 is used as the main operation interface of the smart mobile telecommunication device 30. Both sensors 320 as secondary operation interfaces are disposed at two ends of one holding surface 304, and the sensors 320 can be capacitive sensors, optical sensors or resistance sensors.

When a user uses the smart mobile communication device 30 as a game player, the user can hold the two short sides of the smart mobile communication device 30 by two hands with the holding surface 304 in front of the user. At this point, the user can use the thumbs of the two hands to touch the touch screen 310 and use the index fingers to press the two sensors 320, so that games in the smart mobile communication device 30 can be easily played.

Figure 9:
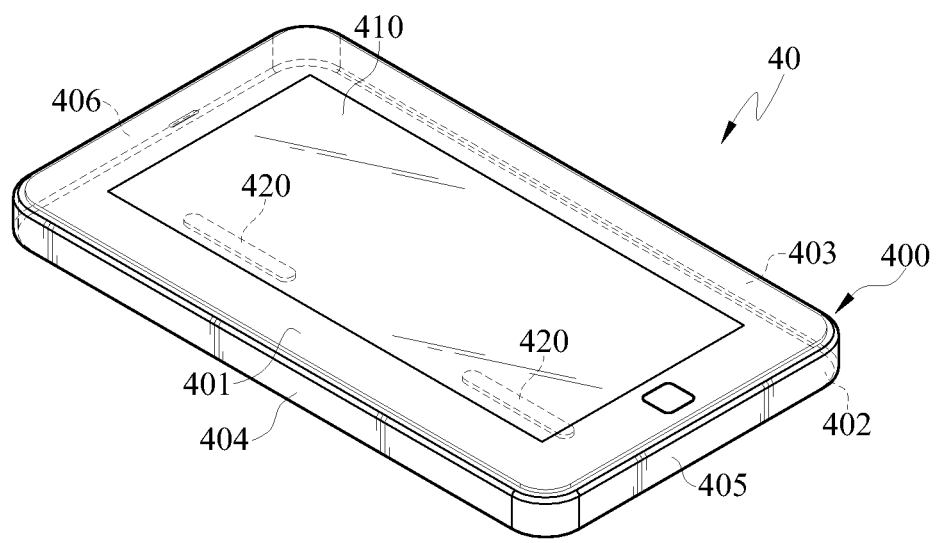
FIG. 9 is a perspective view of the smart mobile communication device according to yet another embodiment of the disclosure.

FIG. 9 is a perspective view of a smart mobile communication device according to yet another embodiment of the disclosure. The structure of the smart mobile communication device is substantially the same as that of the embodiment in FIG. 1. Therefore, the similarities will not be mentioned herein again.

The smart mobile communication device 40 of this embodiment comprises a casing 400, a touch screen 410 and two sensors 420. The casing 400 has a front surface 401 and a back surface 402 opposite to each other, and two pairs of holding surfaces (403, 404) and (405, 406). In each pair, the holding surfaces face each other. Moreover, the holding surfaces 403, 404, 405 and 406 are disposed between the front surface 401 and the back surface 402.

The touch screen 410 on the front surface 401 of this embodiment is used as the main control interface of the smart mobile communication device 40. Both sensors 420 as the secondary operation interfaces are disposed on the back surface 402. The sensors 420 can be capacitive sensors, optical sensors or resistance sensors.

According to the smart mobile communication device of the disclosure, the capacitive, optical or resistance sensors disposed on the holding surfaces or the back surface are used as additional input interfaces. Accordingly, the touch screen is used as the main operation interface of the smart mobile communication device, and the capacitive, optical or resistance sensors are used as the secondary operation interfaces of the smart mobile communication device. In such a situation, the smart mobile communication device, such as smart phone, can be operated more conveniently.

Note that the specifications relating to the above embodiments should be construed as exemplary rather than as limitative of the present disclosure, with many variations and modifications being readily attainable by a person skilled in the art without departing from the spirit or scope thereof as defined by the appended claims and their legal equivalents.

What is claimed is:

1. A smart mobile communication device, comprising:
a casing, the casing having a front surface and at least two opposite holding surfaces, the front surface being disposed between the at least two opposite holding surfaces;
a touch screen disposed on the front surface for being a main operation interface of the smart mobile communication device; and
two optical sensors respectively disposed on the at least two opposite holding surfaces for being secondary operation interfaces of the smart mobile communication device, wherein each of the optical sensors further comprises:
an image sensor; a transparent plate disposed above the image sensor, the transparent plate having a contact surface on its back side relative to the image sensor; and an infrared light emitting unit disposed by a side of the image sensor; wherein a scattering structure is disposed on a side of the transparent plate facing the image sensor and the optical sensor further comprises an optical lens set and an infrared light filter, the optical lens set is disposed between the transparent plate and the image sensor, the infrared light filter is disposed between the optical lens set and the image sensor.

2. The smart mobile communication device as claimed in claim 1, wherein the casing comprises an upper casing element and a lower casing element, the front surface is disposed on a side of the upper casing element, the at least two holding surfaces are respectively disposed on two opposite sides of the lower casing element, and the lower casing element is detachable to the upper casing element.

3. A smart mobile communication device, comprising:
a casing, the casing having a front surface and at least two opposite holding surfaces, the front surface being disposed between the at least two opposite holding surfaces;
a touch screen disposed on the front surface for being a main operation interface of the smart mobile communication device; and
two optical sensors disposed on one of the at least two opposite holding surfaces for being secondary operation interfaces of the smart mobile communication device, wherein each of the optical sensors further comprises:
an image sensor; a transparent plate disposed on the image sensor, the transparent plate having a contact surface on its back side relative to the image sensor; and an infrared light emitting unit disposed by a side of the image sensor; wherein a scattering structure is disposed on a side of the transparent plate facing the image sensor and the optical sensor further comprises an optical lens set and an infrared light filter, the optical lens set is disposed between the transparent plate and the image sensor and the infrared light filter is disposed between the optical lens set and the image sensor.

4. The smart mobile communication device as claimed in claim 3, wherein the casing comprises an upper casing element and a lower casing element, the front surface is disposed on a side of the upper casing element, the at least two opposite holding surfaces are disposed on two opposite sides of the lower casing element, and the lower casing element is detachable to the upper casing element.

5. A smart mobile communication device, comprising:
a casing, the casing having a front surface and a back surface opposite to each other;
a touch screen disposed on the front surface for being a main operation interface of the smart mobile communication device; and two optical sensors disposed on the back surface for being secondary operation interfaces of the smart mobile communication device, wherein each of the optical sensors further comprises:

an image sensor; a transparent plate disposed on the image sensor, the transparent plate having a contact surface on its back side relative to the image sensor; and an infrared light emitting unit disposed by a side of the image sensor; wherein a scattering structure is disposed on a side of the transparent plate facing the image sensor and the optical sensor further comprises an optical lens set and an infrared light filter, the optical lens set is disposed between the transparent plate and the image sensor and the infrared light filter disposed between the optical lens set and the image sensor.

6. The smart mobile communication device as claimed in claim 5, wherein the casing comprises an upper casing element and a lower casing element, the front surface is disposed on a side of the upper casing element, the back surface is disposed on the lower casing element, and the lower casing element is detachable to the upper casing element.

* * * * *